(12) United States Patent
Otterbach et al.

(10) Patent No.: US 12,466,482 B2
(45) Date of Patent: Nov. 11, 2025

(54) FAIL OPERATIONAL STEERING ANGLE SENSOR

(71) Applicant: BOSCH CAR MULTIMEDIA PORTUGAL, S.A., Braga (PT)

(72) Inventors: Jens Otterbach, Ludwigsburg (PT); José António Azevedo Gonçalves, Arcozelo Bcl (PT); Rui Manuel Peixoto Faria, Braga (PT); Fábio André Da Costa Leitão, Gondifelos (PT); Álvaro Miguel Santos Magalhães, Oporto (PT)

(73) Assignee: BOSCH CAR MULTIMEDIA PORTUGAL, S.A., Braga (PT)

( * ) Notice: Subject to any disclaimer, the term of this patent is extended or adjusted under 35 U.S.C. 154(b) by 0 days.

(21) Appl. No.: 18/693,736

(22) PCT Filed: Dec. 21, 2021

(86) PCT No.: PCT/IB2021/062112
§ 371 (c)(1),
(2) Date: Mar. 20, 2024

(87) PCT Pub. No.: WO2023/118930
PCT Pub. Date: Jun. 29, 2023

(65) Prior Publication Data
US 2024/0391527 A1    Nov. 28, 2024

(30) Foreign Application Priority Data
Dec. 21, 2021   (PT) .......................................... 117656

(51) Int. Cl.
B62D 15/02    (2006.01)
(52) U.S. Cl.
CPC .............................. B62D 15/0215 (2013.01)

(58) Field of Classification Search
CPC .. B62D 15/0215; G01D 2205/28; G01D 3/08; G01D 5/204; G01D 5/2452; G01D 5/56
See application file for complete search history.

(56) References Cited

U.S. PATENT DOCUMENTS

| | | | |
|---|---|---|---|
| 9,869,539 B2 * | 1/2018 | Klimenko | G01L 3/104 |
| 10,081,388 B2 * | 9/2018 | Choi | B62D 6/10 |

(Continued)

FOREIGN PATENT DOCUMENTS

| | | |
|---|---|---|
| DE | 102011002563 A1 | 6/2012 |
| DE | 102019133582 A1 | 6/2021 |

(Continued)

OTHER PUBLICATIONS

International Search Report and Written Opinion for Corresponding International Application No. PCT/IB2021/062112, Oct. 11, 2022, 9 pages.

(Continued)

Primary Examiner — Carl C Staubach
(74) Attorney, Agent, or Firm — LUCAS & MERCANTI, LLP

(57) ABSTRACT

A fail operational steering angle sensor for vehicles is provided. The fail operational Steering Angle Sensor comprises one central gear (hub) and two outer gears (Gear 1 and Gear 2) mechanically connected to the hub. The two outer gears have magnetic properties, and they are arranged in the vicinity of a Printed Circuit Board (PCB). The SAS Fail Operational is connected to a Steering Wheel Actuator shaft that, by means of a mechanical connection with the central gear, the two outer gears and a rotor arranged between the central gear and the PCB, provides angular rotation to the above-mentioned moving parts. The variations of the magnetic field and flux originated in the rotation of the mechanical parts will be determined by the PCB.

9 Claims, 3 Drawing Sheets

(56) References Cited

U.S. PATENT DOCUMENTS

| | | | |
|---|---|---|---|
| 10,259,499 B2* | 4/2019 | Adachi | B62D 15/022 |
| 10,800,452 B2* | 10/2020 | Tóth | G01L 5/221 |
| 2008/0000712 A1* | 1/2008 | Tanaka | B62D 15/0215 |
| | | | 73/117.02 |
| 2008/0007251 A1* | 1/2008 | Lee | B62D 15/0215 |
| | | | 324/207.17 |
| 2010/0235054 A1* | 9/2010 | Hoskins | G01D 5/145 |
| | | | 701/42 |
| 2012/0152034 A1* | 6/2012 | Kaess | G01L 3/104 |
| | | | 73/862.333 |
| 2014/0210457 A1* | 7/2014 | Ishimasa | G01D 5/04 |
| | | | 324/207.25 |
| 2014/0266168 A1* | 9/2014 | Utsunomiya | B62D 15/0215 |
| | | | 324/207.25 |
| 2016/0214648 A1* | 7/2016 | Schoepe | G01L 3/104 |
| 2017/0350776 A1* | 12/2017 | Woo | G01L 3/101 |
| 2021/0010880 A1* | 1/2021 | Toyama | G01D 5/04 |
| 2021/0086828 A1* | 3/2021 | Lee | G01L 3/1428 |
| 2022/0396311 A1* | 12/2022 | Hong | B62D 15/0215 |
| 2023/0112736 A1* | 4/2023 | Kim | B62D 5/049 |
| | | | 701/29.7 |

FOREIGN PATENT DOCUMENTS

| | | | | |
|---|---|---|---|---|
| DE | 102020213518 A1 * | 7/2021 | | G01D 11/245 |
| DE | 102020214518 A1 | 3/2022 | | |
| JP | 2009236515 A | 10/2009 | | |

OTHER PUBLICATIONS

International Search Report and Written Opinion for Corresponding International Application No. PCT/IB2021/062124, Sep. 19, 2022, 11 pages.

* cited by examiner

FAIL OPERATIONAL STEERING ANGLE SENSOR

CROSS-REFERENCE TO RELATED APPLICATION

This application is a 371 of PCT/IB2021/062112, filed Dec. 21, 2021, which claimed the priority of Portuguese Application No. 117656, filed Dec. 21, 2021, the contents of each of which are incorporated herein by reference.

TECHNICAL FIELD

The present application describes a fail operational steering angle sensor for vehicles.

BACKGROUND ART

A fail-operational behavior implies that a system continues to perform a defined set of intended functions to a defined extent, with a defined performance, for a defined time in case of a certain amount of failures. This definition leads to the creation of a mechanical system that keeps working for a certain period even if one mechanical component fails.

With the growth of the autonomous driving in the automotive market, a new steering system is now becoming more and more a reality, particularly systems that meets the fail-operational standards and requirements, like a Steer by Wire system. These steering systems remove the steering shaft that connects the steering wheel and the rack system. Herein, inside of the passenger compartment of the vehicle there is an Upper System, or Steering Wheel Actuator (SWA), that is composed, among other components, by a motor, several sensors, the steering wheel and a shaft connecting all elements (SWA shaft). The motor allows the driver to keep having resistance forces while promoting rotation turns in the steering wheel. The sensors are responsible for measuring the angle and the torque on the driver's hands.

Altogether, aligned with several sensors and actuators on the Lower System, or Steering Rack Actuator (SRA), they allow the driver to feel a conventional driving experience as we have nowadays in normal vehicles while directing the wheels and have the feeling from the resulting forces of the road in the driver's hands. In addition, it also allows the possibility of switching off the steering wheel and enjoying the autonomous driving without having the steering wheel turning.

In the new Steering by Wire systems, the consequences in case of a failure of one of those sensors is much higher when compared with present steering systems equipped with a steering shaft. In current technology, the failure of the sensors does not affect directly the safe of the passengers since there is always a mechanical connection between the steering elements.

From this technological evolution raises the need to obtain a Fail Operational Sensor to measure the exact angle of the steering wheel, while ensuring the complete availability of the angle's signal regardless of whether a failure occurs. The sensory system must allow the vehicle to remain working correctly until it reaches a safe place to park or a workshop to repair the system. Said sensory system, is therefore a device that measures the angle and speed of the steering wheel. The information measured by the Steering Angle Sensor is sent to the Steering control system for analysis, where, together with information provided by other existing sensors, are used to control various driving assistance systems, such as electronic stability control.

Nowadays, if one mechanical component fails in the SAS, the whole sensor fails, stopping working for safety reasons. For instance, if one of two simultaneously operating gears fail, the sensor will only be able to read the signal from one gear, and there will be no valid output signal, since both gears are needed to provide the angle in the given range.

Apart from this known issue, to ensure the correct transmission of movement between a hub and an outer gear of a SAS, it is required a minimum gap between the teeth of the gears in order to accommodate thermal expansion of the components when over wide temperature range environments. These gaps, among other existing gaps between moving parts (for example bearing gaps, actuation gaps, etc.), lead to a physical phenomenon known as Hysteresis. This is a key parameter of these type of sensors, and it is mainly observed on the inversions of the direction/rotation of the steering wheel.

One additional and great advantage of the Steer by Wire systems, apart from the possibility of the switch on/off mode, is the possibility of having different steering ratio, i.e., the number of possible turns of the steering wheel. A driver can select a Steering Driver Mode and switch from a Comfort Mode to a Sport Mode. This change in the setup configuration can modify the number of steering wheel turns, for example, from two and a half turns for each side from central position (Comfort Mode) to one turn for each side from central position (Sport Mode). So, this means, the range of the sensor could change, i.e., from ±900° to ±360°, depending on the driver's mode. This possibility brings the necessity of having a higher accuracy on the sensors. For instance, if the wheels turn ±40° by actuating a Steering System, with a sensor that has an angle error of 5° (part is coming from hysteresis), the impact on the wheels will be 0.22° (in Comfort mode—Steering ratio 1:22, 5). In a Sports mode the same sensor, would have an impact on the wheels of 0.55° (in Sports mode—Steering ratio 1:9). This lack of accuracy can have impact on the trajectory of the vehicle, particularly when the vehicles are operating in Sport Mode.

Nowadays, with the existing Steering systems there is no delay on the movements of the wheels because there is a physical connection between the steering wheel and the wheels. Once the driver actuates the steering wheel, the force goes through the steering shaft to the wheels. So, in the traditional systems, the SAS reads and sends a signal of the intention of the driver, eventually with some deviation on the angle, but without majorly affecting the driver intention. However, if the steering shaft is removed, there is no physical connection between steering wheel and wheels. By applying a current SAS in the new Steering by Wire systems, with the lack of accuracy of the sensor previously described, it will have direct impact on the position of the wheels of the vehicle, leading to a poor driving experience, performance, and, in worst case scenario, to a potential safety risk to driver, occupants or passersby.

So, the currently existing SAS configurations have two major problems for the direct application in Steer By Wire systems. One is related to the fact that if one component fails, the whole system stops working. The second one is related with the overall accuracy of the SAS which is very limited.

SUMMARY

The present invention describes a fail Operational Steering Angle Sensor for vehicles, comprising a disk-shaped hub comprising a central circular opening; at least two disk-shaped outer gears, gear A and gear B, mechanically connected to the disk-shaped hub by means of protruding teeth in an outer rim of the disk-shaped hub and an outer rim of the at least two disk-shaped outer gears; and a printed circuit board arranged over the disk-shaped hub and the at least two disk-shaped gears; wherein the disk-shaped hub comprises a drive key located in the central circular opening to mechanically fit a SWA shaft through said central circular opening, and to mechanically fit a disk-shaped rotor between the printed circuit board and said disk-shaped hub.

In a proposed embodiment of present invention, the SWA shaft promotes direct rotation variations of the disk-shaped hub and of the disk-shaped rotor, and indirect opposite rotation variations of the at least two disk-shaped outer gears by inherent contact with the disk-shaped hub.

Yet in another proposed embodiment of present invention, the printed circuit board is configured to determine rotation variations in the disk-shaped hub, the disk-shaped rotor and the at least two disk-shaped outer gears.

Yet in another proposed embodiment of present invention, the at least two disk-shaped outer gears comprise different diameters and different number of protruding teeth.

Yet in another proposed embodiment of present invention, the at least two disk-shaped outer gears comprise different material properties.

Yet in another proposed embodiment of present invention, the disk-shaped rotor comprises a disk-shaped surface with a set of openings.

Yet in another proposed embodiment of present invention, the disk-shaped rotor comprises a central circular opening extending along and over the internal part of the central circular opening of the hub, which comprises a rotor gap that ensures the mechanical alignment with the hub drive key positioned in the internal part of the circular opening of said hub.

Yet in another proposed embodiment of present invention, the rotor gap is mechanically aligned with a steering shaft keyway comprised in the SWA shaft, and with the drive key.

Yet in another proposed embodiment of present invention, the printed circuit board comprises a set of inductive coils evenly distributed over its surface in a circular arrangement and correctly aligned with the set of openings of the disk-shaped rotor.

General Description

The present application describes a Fail Operational steering angle sensor.

The proposed configuration of present disclosure allows to solve both of the above-mentioned state-of-the-art problems, i.e., the freezing of the system in case of failure of one of the components and the overall accuracy of the developed systems. It allows not only to improve the quality of the signal by reducing the hysteresis, but also ensure a mechanical Fail Operational Sensor, which is an optimum solution for Steer by Wire Systems.

The current mechanical configuration of a Steering Angle Sensor (SAS) comprises one central gear (hub) and two outer gears (Gear 1 and Gear 2) mechanically connected to said hub. These two outer gears have magnetic properties, and they are configured and arranged bellow a Printed Circuit Board (PCB). Arranged on the PCB, and on top of the two outer gears, an Integrated Circuit (IC) is positioned in order to detect the variations of the magnetic field originated in the two outer gears. The hub is connected to a steering shaft by a drive key/keyway system. When the driver turns the steering wheel of the vehicle, it turns the hub and consequently the hub will move the two outer gears so the IC positioned in the PCB will be able to detect the angular position of the gears. These two outer gears have a different number of teeth, when combined with the number of teeth of the hub, allow the sensor to measure and obtain an angular range that enables the vehicle to know the real position of the steering wheel independently of any power cycle, the True Power On. The True Power On characteristic allows to for example, whenever the driver switches off the vehicle leaving the steering wheel in a defined position, when powering back on the vehicle, the system will know exactly the correct position of the steering wheel. This is also true even if for some reason the steering wheel is not the same position before and after the power cycle.

These four components (two outer gears, hub and PCB) are usually structurally supported by a housing, ensuring the correct alignment and positioning of all the components. Finally, a cover closures the interior of the housing with all components.

In the new constructive concept of the present invention herein disclosed, i.e., the Fail Operational SAS, the two outer gears have magnetic properties, but are composed of different materials. Gear A is made by one magnetic material (Material A) and the Gear B is made from a different magnetic material (Material B). Both of said outer gears are arranged and placed bellow an integrated circuit (IC) incorporating sensing elements which are installed in a printed circuit board (PCB).

In addition to this configuration, an additional metallic rotor is added to the Fail Operational Steering Angle Sensor, being placed close to the PCB. This rotor comprises several wing shaped protrusions which are located in the vicinity of the PCB. The rotor also comprises a cylindrical element which is firmly connected to the Steering Wheel Actuator (SWA) shaft.

On the PCB, in the vicinity of the rotor wing shaped protrusions, there are several cooper coils connected with a specific IC which is configured to detect the variation of the magnetic flux when the metallic rotor turns.

Therefore, in the proposed mechanical configuration, there is a redundancy of the signals, two magnetic signals are provided by the two outer gears movement, and one inductive signal is provided by the metallic rotor.

These different types of source signals imply a new Hardware configuration. Both, Mechanical and Hardware configurations create a "Heterogeneous redundancy" of both signals.

With the herein proposed invention, a new mechanical configuration of a fail operational sensor is presented, which provides an overall sensor accuracy improvement by reducing the hysteresis of the sensor.

Another advantage of the Fail Operational principle of the sensor is ensured through the redundancy of all mechanical components.

BRIEF DESCRIPTION OF THE DRAWINGS

For better understanding of the present application, figures representing preferred embodiments are herein attached which, however, are not intended to limit the technique disclosed herein.

FIG. 1—illustrates a new approach and embodiment of a fail operational steering angle sensor, wherein the reference numbers relate to:

10—Fail Operational Steering Angle Sensor;
100—cover;

110—printed circuit board (PCB);
120—rotor;
130—hub;
140—gear B;
150—gear A;
160—housing.

Figure 2:
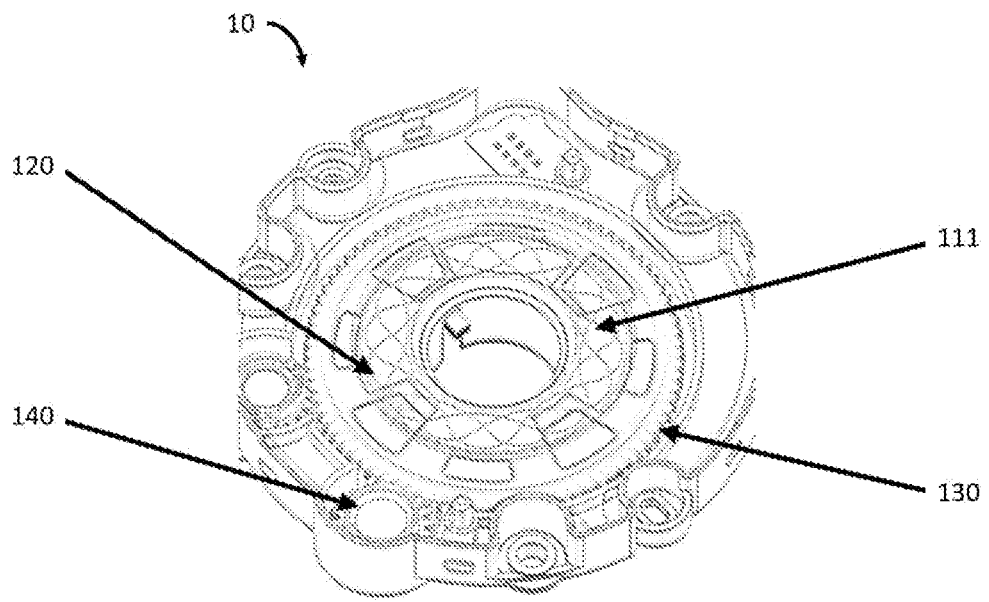

FIG. 2—illustrates a possible embodiment of the proposed fail operational steering g angle sensor, in which is represented the new mechanical and electronic relation between the constituting elements of the sensor, wherein the reference numbers relate to:

10—Fail Operational Steering Angle Sensor;
111—inductive coils in PCB;
120—rotor;
130—hub;
140—gear B.

Figure 3:
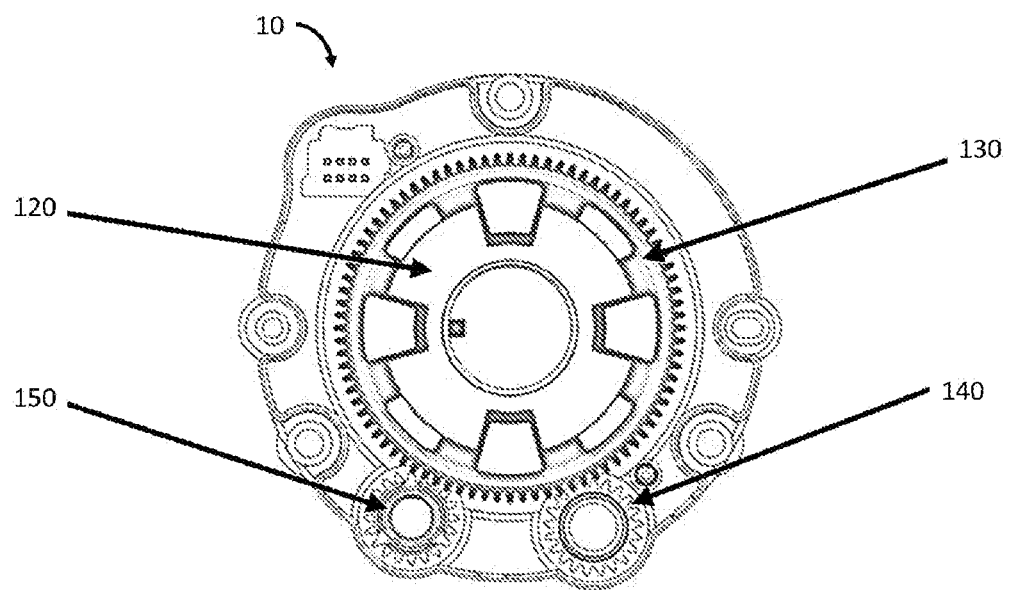

FIG. 3—illustrates the key mechanical elements of the proposed fail operational steering angle sensor, wherein the reference numbers relate to:

10—Fail Operational Steering Angle Sensor;
120—rotor;
130—hub;
140—gear B (made of material B);
150—gear A (made of material A).

Figure 4:
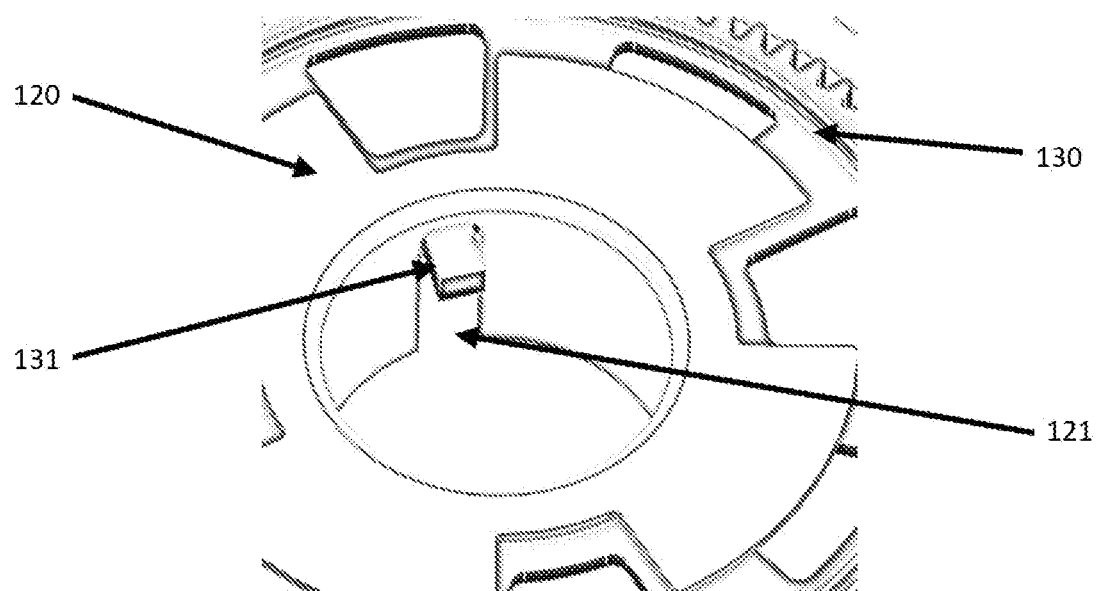

FIG. 4—illustrates the actuation sensor of the fail operational steering angle sensor (10), wherein the reference numbers relate to:

120—rotor;
121—rotor gap;
130—hub;
131—hub drive key.

Figure 5:
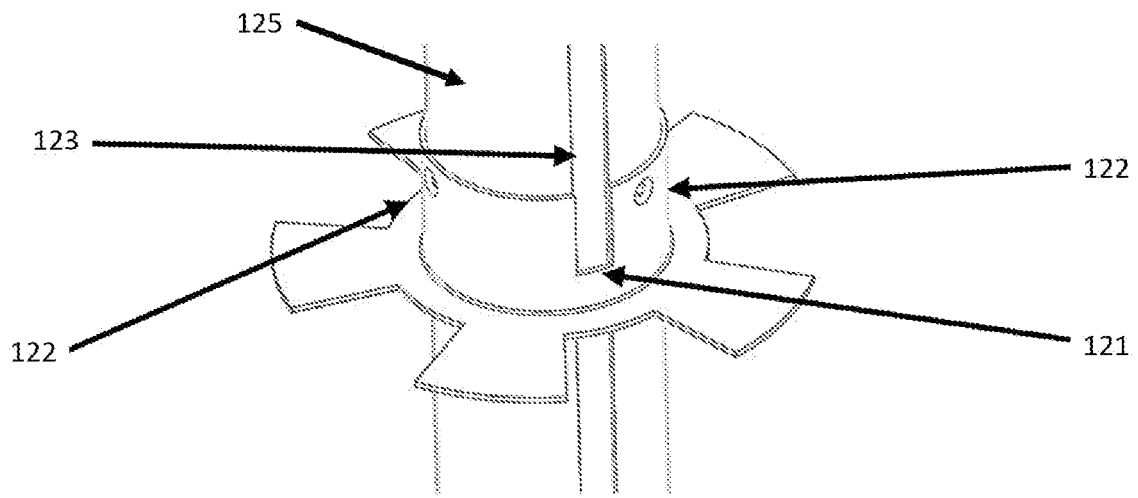

FIG. 5—illustrates the rotor (120) connection of the fail operational steering angle sensor (10) to the Steering Wheel Actuator shaft (125), wherein the reference numbers relate to:

121—rotor gap;
122—rotor punch area;
123—steering shaft keyway;
125—SWA shaft.

Figure 6:
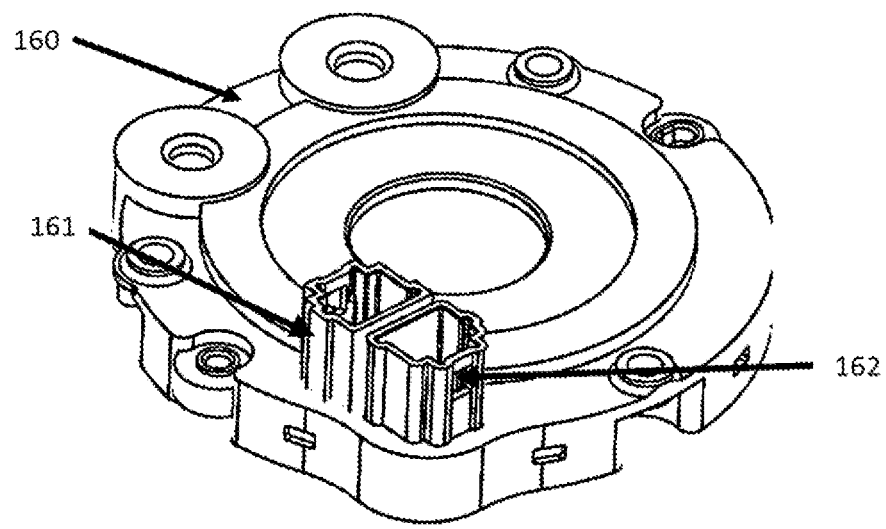

FIG. 6—illustrates the housing (160) connection of the fail operational steering angle sensor (10) to external systems, wherein the reference numbers relate to:

160—housing;
161—connector A;
162—connector B.

DESCRIPTION OF EMBODIMENTS

With reference to the figures, some embodiments are now described in more detail, which are however not intended to limit the scope of the present application.

Figure 1:
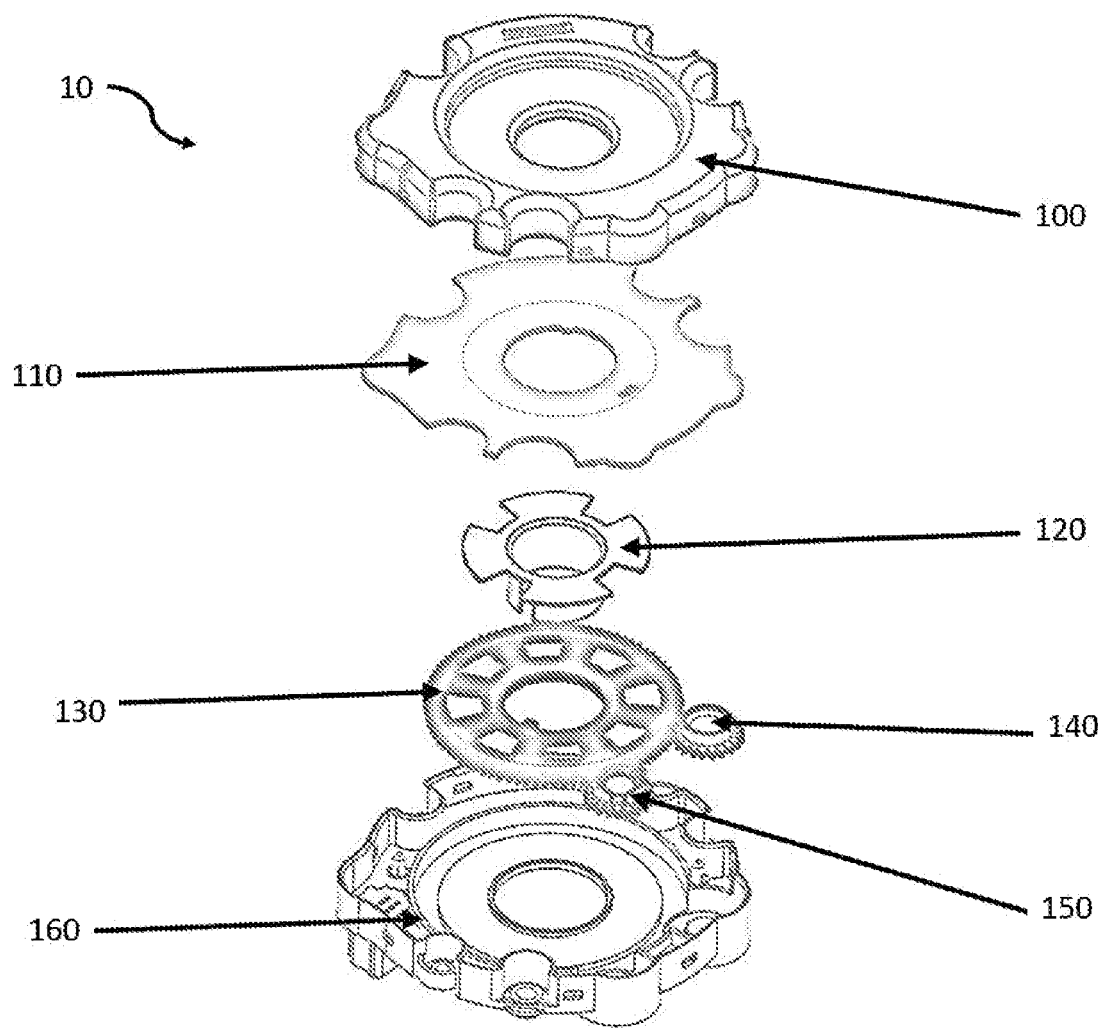

According to the illustration disclosed in FIG. 1, in which an exploded view of the developed sensor (10) is represented, it is possible to identify the correct positioning and mechanical linking between all the constituting elements. Inside a housing (160), that will be further closed by a cover (100), a set of mechanical and electrical internal components will be arranged in order to interact between them. In the internal part of the housing (160), that involves the internal components, a flat circular shape hub (130) comprising a set of teeth in outer rim and a circular opening centrally positioned is arranged in order to match an existing circular opening in the housing (160), which is also centrally positioned with regard to the overall arrangement of said housing (160). Both of said aligned central circular openings will allow the mechanical traversing and contact with the SWA shaft (125) connected to the steering wheel, as suggested in illustrated FIG. 5. Mechanically connected with the outer rim teeth of the hub (130), it will be positioned a set of circular shaped outer gears also comprising a set of teeth in their outer rim and a circular opening centrally positioned, gear A (150) and gear B (140). Both gears (140, 150) comprise smaller diameter with regard to the hub (130) and are also provided with teeth positioned in the outer rims in order to perfectly match the teeth of the hub (130).

The gear A (150) and gear B (140) are composed of two different materials, and with different magnetic properties. Gear A (150) is made of a magnetic material A and the gear B (140) is made of a magnetic material B. By using two different base materials on the gears (140, 150), the system ensures two different failure mechanisms. For instance, the material A of the gear A (150) has a better mechanical performance and material B of the gear B (140) has a better thermal performance. This means that, if the sensor is exposed to very severe thermal condition, i.e., thermal amplitudes, the gear A (150) might fail, but the sensor will remain working with gear B (140) since it comprises better thermal performance. The same happens with the mechanical load, if the gear B (140) fails due to extreme load, gear A (150) will withstand it and remain working since it comprises a better mechanical performance. The key feature to ensure this behavior, withstanding extreme external agents, is selecting the most performant and adequate materials for each of the gears. In one of the proposed embodiments of the present invention, in a non—limiting way, the gear A (150) is made of a list of at least of a polymer with magnet pill inside, being obtained through an overmolding method, and gear B (140) being internally made of magnetic material. In the proposed embodiment, the materials used in both gears (140, 150) are not completely equal in terms of physical properties, but by using a combination of two completely different materials, it is possible to reduce significantly the probability of a failure in both gears (140, 150) at the same time. The proposed material combination used in gear A (150) despite its lower performance in terms of lower working temperature, mechanical resistance, creep effect and thermal expansion, provides increased performance with regard to toughness and wear resistance. On the other hand, the proposed material combination used in gear B (140) although comprising lower toughness and lower wear resistance, withstands high working temperatures, comprises a higher mechanical resistance, overcomes the creep effect and comprises a lower thermal expansion.

In one of the possible embodiments of the present invention the hub (130) rotates over a dedicated bearing arrangement. Gear A (150) and gear B (140) are also positioned and rotate over a dedicated bearing arrangement. The bearing arrangements of the hub (130), gear A (150) and gear B (140), are independent from each other and are defined by the housing (160). In another preferable embodiment of present invention, in a non—restrictive arrangement, over the hub (130), and both gears A (150) and B (140), which are preferably positioned over the same rotation plane, a circular shaped rotor (120) with a set of protrusions will be placed, comprising a similar circular opening and with similar diameter, being its center of rotation aligned with the center of rotation of the hub (130). The rotor (120) is firmly connected with the SWA shaft (125) and is mechanically designed to be aligned with the hub (130) and rotate along with it, this being accomplished through an existing rotor gap (121) along the circular opening that extends along and over the internal part of the circular opening of the rotor (120) and that matches an existing hub drive key (131) positioned in the internal part of the circular opening of said hub (130).

Since the hub (130) is the key elements for actuating the gears (140, 150), in existing state—of—the—art steering angle sensors, if a specific part of the hub (130) fails the complete sensor will fail. In the herein proposed mechanical arrangement of the fail operational SAS (10), if the hub (130) operationally fails, the rotor (120) will maintain its moving/rotating activity in an independent manner, ensuring that there will still be a signal provision from the steering. In this particular case, in case of the hub (130) fails, the gears (140, 150) will no longer move and there will be no angle range for True Power On. However, the rotor (120) will still be moving/rotating and providing the rotational angle signal. In addition, an internal software will be configured to process and determine the number of turns of the rotor (120), ensuring the provisioning of the signal of the steering wheel position. Even in case of the occurrence with this setback/downgrade of the signal from the sensor (10), therefore losing the True Power On, it will still be possible to safely park the vehicle or drive to the nearest workshop in complete safety. The operational safety of the vehicle is never at stake due to the hub (130) failure.

In a similar way, the same happens in case of failure of the rotor (120). If for same reason the rotor (120), or the inductive system composed by the IC and Coils, stops working, the hub (130) and gears (140, 150) will remain working. The only detected regression would be related with the accuracy reduction of the output signal of the sensor (10) originated by the increase of hysteresis, but the driving of the vehicle would still be possible to safely park the vehicle or drive to the nearest workshop in complete safety.

As illustrated in the representative images of the invention, in particular in FIGS. 1, 3 and 4, both the rotor (120) and the hub (130) present a shape similar to a disc. The rotor (120) whose disk—shaped surface rests over the hub (130) also comprises a set of openings distributed along its surface.

Over the previously mentioned set of mechanical parts, a set of electrical components is arranged, which comprises, for example, a printed circuit board (110).

In the FIG. 2, it is possible to observe one of the possible locations of the PCB (110) which is centrally placed over the plane comprised by the hub (130), outer gears (140, 150), and the rotor (120). The proposed PCB (110) comprises a set of inductive coils (111) evenly distributed over its surface, highlighted above the rotor (120), matching and covering the surface comprised by the two overlapped disc shaped hub (130) and rotor (120) in order to determine the variations on their rotation process caused by the existing set of openings in the rotor (120) surface as previously described. These coils (111), along with an additional IC correctly adapted and configured to work along with the PCB (110), are adapted to measure the variation of the magnetic flux promoted by the movement of the rotor (120).

The housing (160) is responsible for the position and alignment of all parts and internal components, and the cover (100) is responsible for ensuring the closure of the apparatus.

In this newly developed mechanical configuration, the hub (130) comprises a drive key (131). When the fail operational steering angle sensor (10) is assembled, the hub's drive key (131) is also assembled in the keyway (123) of the SWA shaft (125). Once the driver rotates the steering wheel of the vehicle, not represented on the figures but mechanically connected to the fail operational steering angle sensor (10) through the SWA shaft (125), it will actuate the hub (130) that will further promote the movement of the outer gears (140, 150) and the rotor (120). To ensure this mechanical connection, in the central circular opening of the rotor (120) there is a gap (121) larger than the hub's drive key (131).

In addition to the current mechanical actuation of the sensor (10), provided by the interaction between the steering shaft keyway (123) and the hub drive key (131), the rotor (120) is firmly connected against the SWA shaft (125) by a set of punches at the same time in three specific points (122). In the SWA shaft (125), there are three indentations (122) located over the same plane and positionally angled 120° apart from each other's. This punch (122) is made by a specific tool during the assembly of the sensor. This assembly deforms the outer part of the circular opening of the rotor (120), that extends along and over the internal part of the circular opening of the hub (130), against the recess on the SWA shaft (125). It creates a local deformation of the rotor (120) and ensures the complete fitment of the rotor (120) against the SWA shaft (125). This feature guarantees a correct fixation between the parts minimizing the existence of gaps between the rotor (120) and the SWA shaft (125).

With the usage of a punched (122) rotor (120) against the SWA shaft (125), with the PCB (110) located bellow with the cooper coils, it is possible to obtain an inductive system without backlash. This type of punch (122) connection is particularly important to reduce the hysteresis of the sensor as previously described. With the proposed configuration, the play of the gears will be kept, but there will be no slack between the rotor (120) and SWA shaft (125). As a consequence, no mechanical hysteresis will affect the inductive signal.

By using a different type of connections between the sensor (10) and the SWA shaft (125), it is possible to divide the failure mode of the transmission. The hub (130) is connected by a drive key/keyway system (131) and the Rotor (120) by punch (122) against the SWA shaft (125). To actuate the rotor (120) or the hub (130), it would be enough a simply overmolded part of Rotor/Hub, but it would only have one connection to the shaft. If that connection fails, the whole sensor fails. In proposed mechanical arrangement of the present invention, this failure is prevented and allows having always transmission between the SWA shaft (125) and the sensor (10) by having two different types of connections.

The inductive measurement as it is designed, only allows to measure a part of a rotation of the SWA shaft (125). For instance, if the rotor (120) has a set of four protrusions/wings, it is only possible to measure four times the 360°/4=90°. This means the number of wings of the rotor (120) must be aligned with the number of teeth of the hub (130) and gear A (150) and gear B (140) in order to have a True Power On between both measurement systems. Both systems must be aligned to do so, Inductive with Gear A (150), Inductive with Gear B (140), and Gear A (150) with Gear B (140). This will provide redundancy in three combinations with three respective nonius signals on how to measure the angle, all with True Power On.

The nonius signal works as a secondary auxiliar scale for measuring instrument that allows to improve the accuracy of the measurements. For example, for a simple angular measuring instrument, with one hub and one gear, if the hub has 50 teeth and the gear 25 teeth, a complete turn of the hubs means 2 turns of the gear. If the system can read, for instance, with 1° of accuracy in the Gear, it means the equipment will be able to read the hub with 0.5° of accuracy.

The consequence of this improvement is the reduction of the range. The system will read just 180° instead of the previous 360°.

In the disclosed invention, the purpose is to read not only the exact position of the steering wheel but also the number of the turns. So, this means, it is not possible to apply only one gear but is necessary to apply two gears with different number of teeth, for having a misalignment in the turns of the gears. This different number of teeth will allow to have a long angle range because the final angle of the sensor will be given by an equation with unmistakable position. For instance, a system with a Hub with 70 teeth, Gear A with 20 and Gear B 21, the sensor range is 2160°. Only after 6 turns, the Gear A and the Gear B will be in the same exact angular position and the system will read the same value as in the beginning of the turning.

In the disclosed arrangement of the Fail Operational SAS (10), the redundancy of the angle source is ensured by three types of signal sources, two of them magnetic and one inductive, resulting in three nonius signals. Nonius signal A will be obtained by the combination of magnetic angles sourced in gear A (150) and gear B (140), nonius signal B will be obtained through the combination of the magnetic angle sourced in gear A (150) with the inductive angle sourced in the rotor (120), and the nonius signal C will be obtained through the combination of the magnetic angle sourced in gear B (140) with the inductive angle sourced in the rotor (120). These three sources of final angles, all with True Power On prevent the possibility of a failure of the sensor (10). If any electrical or mechanical component fails, a downgrade of the signal will occur, through the elimination the redundancy, but ensuring the system remains working, even if only for a short period. The driver will not be in danger if the system fails.

The sensor output redundant signal will be a high precision inductive measurement, ensured by the interaction of the protrusions of the rotor (120) with the inductive coils (111) comprised on the PCB (110), which must be combined with the magnetic measurement, provided by the IC installed in the PCB (110) that is positioned to detect the variations of the magnetic field originated in the two outer gears A (150) and B (140). These two levels of precision reading of the inductive and magnetic signals originated through the rotational movement of all mechanically interconnected parts of the Fail Operational SAS (10), leads to have different weights for the angle calculation, one inductive for fine angle measurement and one for magnetic for high range measurements. These configurations must be set through software adjustment of the Inputs and Outputs of both mentioned signals in order to accommodate the two different hysteresis levels.

In addition to the mechanical key system already described before, the connection to a high—level decisioning system is ensured by two existing connectors (161, 162) in the sensor (10). These two connectors, connector A (161) and connector B (162), ensure a redundancy of the source and signal coming to and through the sensor (10).

The use of a double connection system to an upper decisioning system, through the two different connectors (161, 162), it is possible to ensure the functionality of the sensor (10) even if something fails inside said sensor, i.e., connector pins in PCB fails, or outside the sensor, i.e., male connector fall, or the communications cable is cut. In order to make it possible to achieve this level of redundancy, the signals coming from connector A (161) must be the same as the signals coming from connector B (162). The upper system will then receive doubled information.

Separating both mechanical and electrical connections with the outside devices, i.e., hub/rotor (130, 120) connected with the SWA shaft (125) via two distinct punch area (122) and the PCB (110) to a set of two independent connectors (161, 162) providing independent interfaces for communications and power supplies, allows to reduce the impact of the failure of the housing (160) in the sensor. A failure in the housing (160) may have impact in the magnetic behavior of the gears (140, 150) but the inductive rotor (120) will remain operational. This is also valid in an vice—versa analysis and behavior. This redundancy of physical features to ensure operational status of the sensor (10), leads to an improved performance and reduced probability of overall failure.

This proposed arrangement allows the fail operational SAS Sensor (10) to have two types of measurements, Inductive and Magnetic, the so—called Heterogeneous Redundancy. This reduces the probability of a complete failure in the system. Apart from the heterogeneous redundancy, the elimination of the gaps and backlash in inductive measurement allows the overall accuracy of the sensor (10) to be improved significantly, because there is no mechanical hysteresis between the SWA shaft (125) and the rotor (120). There is also a higher probability of reducing the non—linearity of the sensor. In order to have a better global accuracy of the sensor (10), the software must give different heights when it is calculating the final output angle. Something like, the "fine" or the "zoom" in the angle is given by the Inductive and the global angle is given by the combination of the Inductive and the Magnetic systems (gears).

The invention claimed is:

1. A Fail Operational Steering Angle Sensor (10) for vehicles, comprising
    a disk-shaped hub (130) comprising a central circular opening;
    at least two disk-shaped outer gears, gear A (150) and gear B (140), mechanically connected to the disk-shaped hub (130) by means of protruding teeth in an outer rim of the disk-shaped hub (130) and an outer rim of the at least two disk-shaped outer gears;
    a disk-shaped rotor (120); and
    a printed circuit board (110) arranged over the disk-shaped hub (130), the at least two disk-shaped outer gears, and the disk-shaped rotor (120);
    wherein
    the disk-shaped rotor (120) is arrangede between the printed circuit board (110) and saiddisk-shaped hub (130)
    the disk-shaped hub (130) comprises a drive key (131) located in the central circular opening to mechanically connect to a Steering Wheel Actuator (SWA) shaft (125) by a first connection; and
    the disk-shaped rotor (120) is independently connected against the SWA shaft (125) by a set of punches forming a second connection different from the first connection, whereby the first connection of the disk-shaped hub (130) and the second connection of the disk-shaped rotor (120) provide two different and independent mechanical paths between the SWA shaft (125) and the seosnr (10).

2. The Fail Operational Steering Angle Sensor (10) for vehicles according to claim 1, wherein the SWA shaft (125) promotes direct rotation variations of the disk-shaped hub (130) and of the disk-shaped rotor (120), and indirect opposite rotation variations of the at least two disk-shaped outer gears by inherent contact with the disk-shaped hub (130).

3. The Fail Operational Steering Angle Sensor (10) for vehicles according to claim 1, wherein the printed circuit board (110) is configured to determine rotation variations in the disk-shaped hub (130), the disk-shaped rotor (120) and the at least two disk-shaped outer gears.

4. The Fail Operational Steering Angle Sensor (10) for vehicles according to claim 1, wherein the at least two disk-shaped outer gears comprise different diameters and different number of protruding teeth.

5. The Fail Operational Steering Angle Sensor (10) for vehicles according to claim 1, wherein the at least two disk-shaped outer gears comprise different material properties.

6. The Fail Operational Steering Angle Sensor (10) for vehicles according to claim 1, wherein the disk-shaped rotor (120) comprises a disk-shaped surface with a set of openings.

7. The Fail Operational Steering Angle Sensor (10) for vehicles according to claim 1, wherein the disk-shaped rotor (120) comprises a central circular opening extending along and over the internal part of the central circular opening of the hub (130), which comprises a rotor gap (121) that ensures the mechanical alignment with the hub drive key (131) positioned in the internal part of the circular opening of said hub (130).

8. The Fail Operational Steering Angle Sensor (10) for vehicles according to claim 7, wherein the rotor gap (121) is mechanically aligned with a steering shaft keyway (123) in the SWA shaft (125), and with the drive key (131).

9. The Fail Operational Steering Angle Sensor (10) for vehicles according to claim 1, wherein the printed circuit board (110) comprises a set of inductive coils (111) evenly distributed over its surface in a circular arrangement and correctly aligned with the set of openings of the disk-shaped rotor (120).

* * * * *